(No Model.)
W. A. MILLER.
CROSSCUT SAW.
No. 434,352. Patented Aug. 12, 1890.
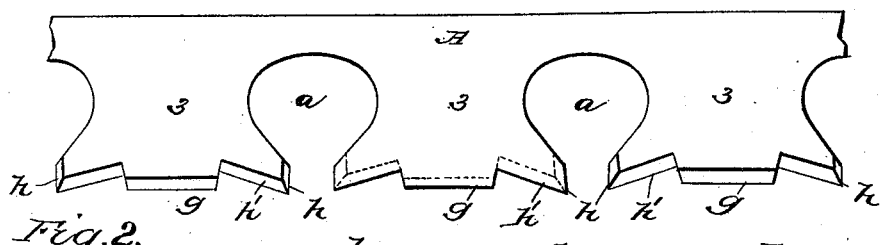
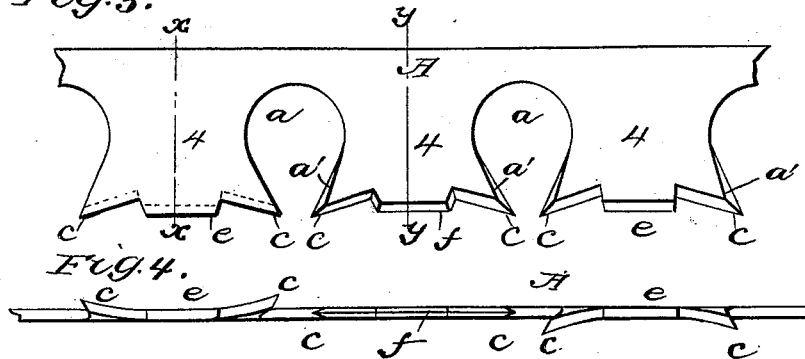
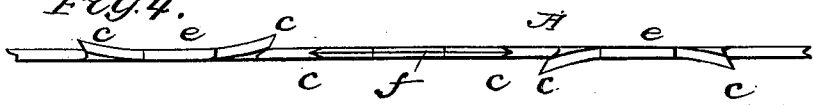
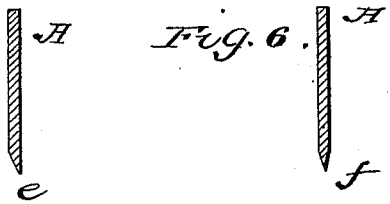
WITNESSES:
W. R. Davis
C. Sedgwick
INVENTOR:
W. A. Miller
BY Munn & Co
ATTORNEYS.

UNITED STATES PATENT OFFICE.

WILLIAM A. MILLER, OF WAPINITIA, OREGON.

CROSSCUT-SAW.

SPECIFICATION forming part of Letters Patent No. 434,352, dated August 12, 1890.

Application filed August 20, 1889. Serial No. 321,336. (No model.)

*To all whom it may concern:*

Be it known that I, WILLIAM A. MILLER, of Wapinitia, in the county of Wasco and State of Oregon, have invented a new and useful Improvement in Crosscut-Saws, of which the following is a full, clear, and exact description.

My invention relates to an improvement in crosscut-saws, and has for its object to produce a saw which will cut rapidly with little frictional resistance, require less filing for the amount of work performed than saws in general use, and that can be manufactured without increased expense compared to ordinary crosscut-saws.

With these objects in view my invention consists in the peculiar conformation of the teeth, as well as the manner of setting the teeth with regard to the blade of the saw.

Reference is to be had to the accompanying drawings, forming a part of this specification, in which similar letters and figures of reference indicate corresponding parts in all the views.

Figure 1 is a side view of one form of saw-tooth cut and set to embody my invention. Fig. 2 is an edge view thereof. Fig. 3 is a side view of a slightly-modified form of tooth. Fig. 4 is an edge view of Fig. 3. Fig. 5 is a cross-section of the blade shown in Fig. 3, taken on the line $x$ $x$ in said figure; and Fig. 6 is a cross-section of the same saw-blade, taken on the line $y$ $y$, same figure.

The teeth of all crosscut-saws are adapted to cut in each direction of their reciprocal travel, and an angular inclination outward from the blade, technically known as their "set," is given to them in opposite directions alternately. In action the saw produces a kerf or channel wider than the thickness of the blade, which is intended to afford clearance for the blade and prevent the wedging action of sawdust accumulations that by friction retards the saw.

It being well known that the ordinary form of crosscut-saw teeth is defective and that the set of the teeth will not afford the necessary clearance for the blade when the saw is used to cross-cut thick timber, provision has heretofore been made to overcome the frictional resistance by providing a series of spaced slots, which extend upwardly from the toothed edge of the saw, these slots being of such proportionate width as to receive the sawdust and measurably reduce friction on the blade.

It has been found by practical experiment that the teeth of crosscut-saws will cut with greater ease and permit more rapid work with reduced labor if their cutting-edges are presented at an inclination to the surface they engage similar to the shaving portion of a plane-bit.

In the drawings, A indicates the blade, which is provided with a series of notches or dust-cavities $a$, the walls of which preferably incline toward each other, between which the tooth-sections are formed. In Figs. 1 and 2 said teeth, having chisel-shaped projecting blades, are shown at $h$, each pair of these teeth being set on the same side of a section, while the teeth of alternate sections are set on opposite sides of the blade. Vertically-depending short chisel-blades $g$ are integrally formed between the oppositely-projecting teeth $h$. These are beveled alternately from opposite sides of the blade and are not set laterally. The cutting-teeth $h$ in this form of construction have a shaving action with their upright edges and a clean-cutting shearing action upon the material with their lower slightly-inclined edges $h'$. The intermediate chisel-blades $g$ steady the saw-blade and prevent it from jumping or running roughly over corners or through narrow strips of wood. These may also be made to gage the cutting action of the saw, as, if these chisel-blades extend nearly the length of the vertical depth of the teeth $h$, the latter will only slightly engage the wood and cut slowly, whereas if the chisel-blades $g$ are shorter, proportionate to the teeth $h$, the latter will cut faster.

In Figs. 3 and 4 there is a form of the teeth $c$ shown combined with the blades $f$, the teeth being beveled like chisels in pairs, which are on the same section 4 and on the same side of the saw-blade. Each pair of teeth of a section 4 are set or laterally inclined toward the same side of the blade, the alternate sets of two teeth being set in opposite directions, as shown in Fig. 4.

In the construction just described the chisel-blades $f$ are beveled from each side to a center line, which enables them to hold the saw steady when in action. The degree of inclination of all the teeth in a saw should be the same. The adjacent edges $a'$ of the teeth-sections 4 4 (shown in Fig. 3) are beveled in opposite directions, whereby said edges will have a shear-cut upon the material operated on.

All of the styles of cutting-teeth shown have their lower cutting-sides inclined slightly upward from a horizontal plane, this being a leading feature of my present invention.

The advantages attained by constructing the teeth with a bottom edge, as stated, consist, essentially, in their presenting a shear-cutting edge to the wood fiber, cutting it freely and not mangling the material, the tough stringy species of wood being cut smoothly and without binding in the kerf incidental to saws having ordinary V-shaped teeth. The teeth $c$, being comparatively wide at their base, are strong and not liable to spring laterally or be cramped and lose their set, which would cause the saw to work hard.

The track-cleaning devices introduced are all based on one general principle and are of good service, particularly in cutting through thick green logs or other large timber.

Having thus fully described my invention, I claim as new and desire to secure by Letters Patent—

1. In a crosscut-saw, the combination, with teeth-sections having shear-cutting lower edges slightly inclined upward from a horizontal plane, said shear edges set in reverse directions and the lower adjacent edges of said teeth projected in opposite lateral directions, of track-clearing teeth alternately located between each pair of cutting-teeth, said teeth having vertical beveled cutting-edges, substantially as and for the purpose described.

2. In a crosscut-saw, the combination, with teeth-sections having lower shear-cutting edges slightly inclined upward from a horizontal plane, of the track-clearing teeth alternately located between said cutting-teeth, the lower vertical edges of said clearing-teeth having oppositely-disposed cutting-teeth having shear-cutting edges, substantially as shown and described.

3. The combination, with the tooth-sections separated by dust-receiving cavities, each section having two teeth, the lower edges of which incline upward toward each other, said inclined edges sheared and set in reverse directions, of the clearance-teeth alternately disposed between said sections, said teeth being unset and provided with vertically-sheared edges and beveled lower edges, substantially as shown and described.

4. The combination of the cutting-teeth, the clearing-teeth alternately disposed between said cutting-teeth, having lower cutting-edges slightly inclined upward from a horizontal plane and provided at their vertices with downwardly-projecting chisel-like portions, substantially as and for the purpose set forth.

WILLIAM A. MILLER.

Witnesses:
I. L. CONFER,
O. P. WEBERG.